United States Patent
Jung et al.

(10) Patent No.: US 9,749,916 B2
(45) Date of Patent: Aug. 29, 2017

(54) PRIORITY HANDLING-BASED OPERATION METHOD IN WIRELESS COMMUNICATION SYSTEM AND APPARATUS SUPPORTING SAME

(71) Applicant: LG ELECTRONICS INC., Seoul (KR)

(72) Inventors: Sunghoon Jung, Seoul (KR); Youngdae Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 20 days.

(21) Appl. No.: 14/762,166

(22) PCT Filed: Jan. 21, 2014

(86) PCT No.: PCT/KR2014/000600
§ 371 (c)(1),
(2) Date: Jul. 20, 2015

(87) PCT Pub. No.: WO2014/112853
PCT Pub. Date: Jul. 24, 2014

(65) Prior Publication Data
US 2015/0319627 A1 Nov. 5, 2015

Related U.S. Application Data

(60) Provisional application No. 61/754,637, filed on Jan. 21, 2013.

(51) Int. Cl.
*H04W 36/00* (2009.01)
*H04W 24/02* (2009.01)
*H04W 8/02* (2009.01)
*H04W 48/20* (2009.01)

(52) U.S. Cl.
CPC ......... *H04W 36/0083* (2013.01); *H04W 8/02* (2013.01); *H04W 24/02* (2013.01); *H04W 48/20* (2013.01)

(58) Field of Classification Search
None
See application file for complete search history.

(56) References Cited

U.S. PATENT DOCUMENTS

2011/0199905 A1* 8/2011 Pinheiro ............... H04W 4/005
370/235
2012/0214501 A1 8/2012 Johansson et al.
(Continued)

OTHER PUBLICATIONS

Qualcomm Incorporated, "Dedicated priority storage," 3GPP TSG-RAN WG2 meeting #79bis, R2-124400, Aug. 2012, 3 pages.
(Continued)

*Primary Examiner* — Anh-Vu Ly
*Assistant Examiner* — Roberta A Shand
(74) *Attorney, Agent, or Firm* — Lee Hong Degerman Kang Waimey

(57) ABSTRACT

An operation method performed by a terminal in a wireless communication system is provided. The method includes: applying de-prioritization to one or more frequencies in a de-prioritization frequency list; receiving a de-prioritization cancellation command from a network; and handling the applied de-prioritization on the basis of the de-prioritization cancellation command.

12 Claims, 10 Drawing Sheets

(56) References Cited

U.S. PATENT DOCUMENTS

| | | | | |
|---|---|---|---|---|
| 2013/0095879 A1* | 4/2013 | Gupta | ............... | H04W 76/027 |
| | | | | 455/525 |
| 2013/0308515 A1* | 11/2013 | Guo | ................. | H04W 72/10 |
| | | | | 370/312 |
| 2014/0099969 A1* | 4/2014 | Hwang | ............... | H04W 48/06 |
| | | | | 455/453 |
| 2014/0198640 A1* | 7/2014 | Suzuki | ................. | H04L 47/76 |
| | | | | 370/230 |

OTHER PUBLICATIONS

TeliaSonera, "Correction to absolute priority cell reselection," 3GPP TSG-RAN2 Meeting #79bis, R2-125166, Oct. 2012, 5 pages.
Ericsson, "Overload Management for low priority accesses," 3GPP TSG-RAN WG3 #69bis, R3-102887, Oct. 2010, 4 pages.
PCT International Application No. PCT/KR2014/000600, Written Opinion of the International Searching Authority dated Apr. 28, 2014, 1 page.
Samsung, "Handling of deprioritisation information upon PLMN selection", 3GPP TSG-RAN2#81 meeting, Tdoc R2-130207, Jan. 18, 2013, 2 pages.
Panasonic, "Review of Individual Priority handling", 3GPP TSG-GERAN WG2 Meeting #44, GP-092123, Nov. 12, 2009, 4 pages.
Research in Motion UK Limited, "Deprioritisation handling upon PLMN selection", 3GPP TSG-RAN WG2 #81, R2-130415, Jan. 19, 2013, 3 pages.
European Patent Office Application No. 14740145.9, Search Report dated Sep. 29, 2016, 10 pages.

\* cited by examiner

PRIORITY HANDLING-BASED OPERATION METHOD IN WIRELESS COMMUNICATION SYSTEM AND APPARATUS SUPPORTING SAME

CROSS-REFERENCE TO RELATED APPLICATIONS

This application is the National Stage filing under 35 U.S.C. 371 of International Application No. PCT/KR2014/000600, filed on Jan. 21, 2014, which claims the benefit of U.S. Provisional Application No. 61/754,637, filed on Jan. 21, 2013, the contents of which are all hereby incorporated by reference herein in their entirety.

BACKGROUND OF THE INVENTION

Field of the Invention

The present invention relates to wireless communication and, more particularly, to a priority handling-based operation method in a wireless communication system and an apparatus for supporting the same.

Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Due to mobility of a terminal as a mobile device, quality of a service provided to a current terminal is degraded or a cell capable of providing an excellent service. Accordingly, the terminal may move to a new cell, which refers to movement performing of the terminal.

In a cell reselection process, the terminal selects a target cell on the basis of frequency priority. The terminal may acquire information on the priority through system information of the cell or dedicated signaling. The terminal attempts connection with a target cell by transmitting a connection configuration message. If connection with the target cell is terminated, the terminal may receive the service from the target cell.

Movement of the terminal with respect to the network on the basis of a specific frequency and/or a specific Radio Access Technology (RAT) may be limited according to a wireless communication environment. In this case, the network may provide mobility information on movement limitation to the terminal. For example, the network may lower a reselection priority with respect to at least one specific frequency or a specific RAT, and provide associated information to the terminal.

As an environment of an actual network is changed, when the network releases de-prioritization configuration, the terminal may operate on the basis of information acquired from an existing network. The phenomenon cuts-off the terminal to access a cell capable of actually providing more excellent service. As a result, the service quality provided to the terminal may be deteriorated. Further, since access of the terminal to a specific cell is limited in a network side so that a corresponding cell does not efficiently provide the service, the efficiency in a network optimization side may be limited.

SUMMARY OF THE INVENTION

The present invention provides a priority handling-based operation method in a wireless communication system and an apparatus for supporting the same.

In one aspect, provided is an operation method performed by a terminal in a wireless communication system. The method includes applying de-prioritization to one or more frequencies in a de-prioritization frequency list, receiving a de-prioritization cancellation command from a network and handling the applied de-prioritization on the basis of the de-prioritization cancellation command.

The de-prioritization cancellation command may indicate one or more frequency or specific radio access technology (RAT) in which the applying the de-prioritization is cancelled.

The handling of the applied de-prioritization may comprise removing one or more frequencies indicated by the de-prioritization cancellation command from the de-prioritization frequency list when the de-prioritization cancellation command indicates the one or more frequencies in which the applying the de-prioritization is cancelled.

The method may further comprise applying de-prioritization to a frequency remaining in the de-prioritization frequency list according to the handling of the applied de-prioritization.

The handling of the applied de-prioritization may comprise removing all frequencies of the specific RAT from the de-prioritization frequency list when the de-prioritization cancellation command indicates the specific RAT in which the applying the de-prioritization is cancelled.

The de-prioritization cancellation command may indicate movement to a cell of a specific frequency of a specific RAT.

The handling of the applied de-prioritization may comprise removing the specific frequency indicated by the de-prioritization from the de-prioritization frequency list when the de-prioritization cancellation command indicates to move to the cell of the specific frequency.

The method may further comprise applying to a frequency remaining in the de-prioritization frequency list according to the handling of the applied de-prioritization.

The handling of the applied de-prioritization may comprise all frequencies of the specific RAT from the de-prioritization frequency list when the de-prioritization cancellation command indicates to move to the cell of the specific RAT.

The de-prioritization cancellation command may comprise dedicated priority signaling information usable by the terminal.

The handling of the applied de-prioritization may comprise removing the all frequencies from the de-prioritization frequency list.

The method may further comprise reporting information on the handled de-prioritization to the network.

The method may further comprise stopping a de-prioritization timer associated with a maintenance time to apply the de-prioritization to the one or more frequencies when a frequency is not included in the de-prioritization frequency list according to the handling of the applied de-prioritization.

In another aspect, provided is a wireless apparatus operating in a wireless communication system. The wireless apparatus comprises a Radio Frequency (RF) unit that sends and receives radio signals; and a processor that is functionally coupled to the RF unit and configured to: apply de-prioritization to one or more frequencies in a de-prioritization frequency list, receive a de-prioritization cancellation command from a network and handle the applied de-prioritization on the basis of the de-prioritization cancellation command.

In accordance with a priority handling-based operation method according to an embodiment of the present invention, the terminal may receive a de-prioritization cancellation command from a network to perform de-prioritization-based handling. The terminal may cancel applying of the de-prioritization to a specific frequency before a de-prioritization timer is terminated, and may operate on the basis of the handled priority. Further, the terminal may provide information on the applied de-prioritization to the network, and may receive the de-prioritization command suitable for a network environment to handle the de-prioritization. Accordingly, the terminal may adaptively handle the priority according to the network environment to perform movement so that improved service may be provided. In addition, signaling for erroneous movement of the terminal or limitation in the mobility with respect to the terminal may be prevented so that the efficiency of a radio resource may be improved.

DESCRIPTION OF EXEMPLARY
EMBODIMENTS

Figure 1:
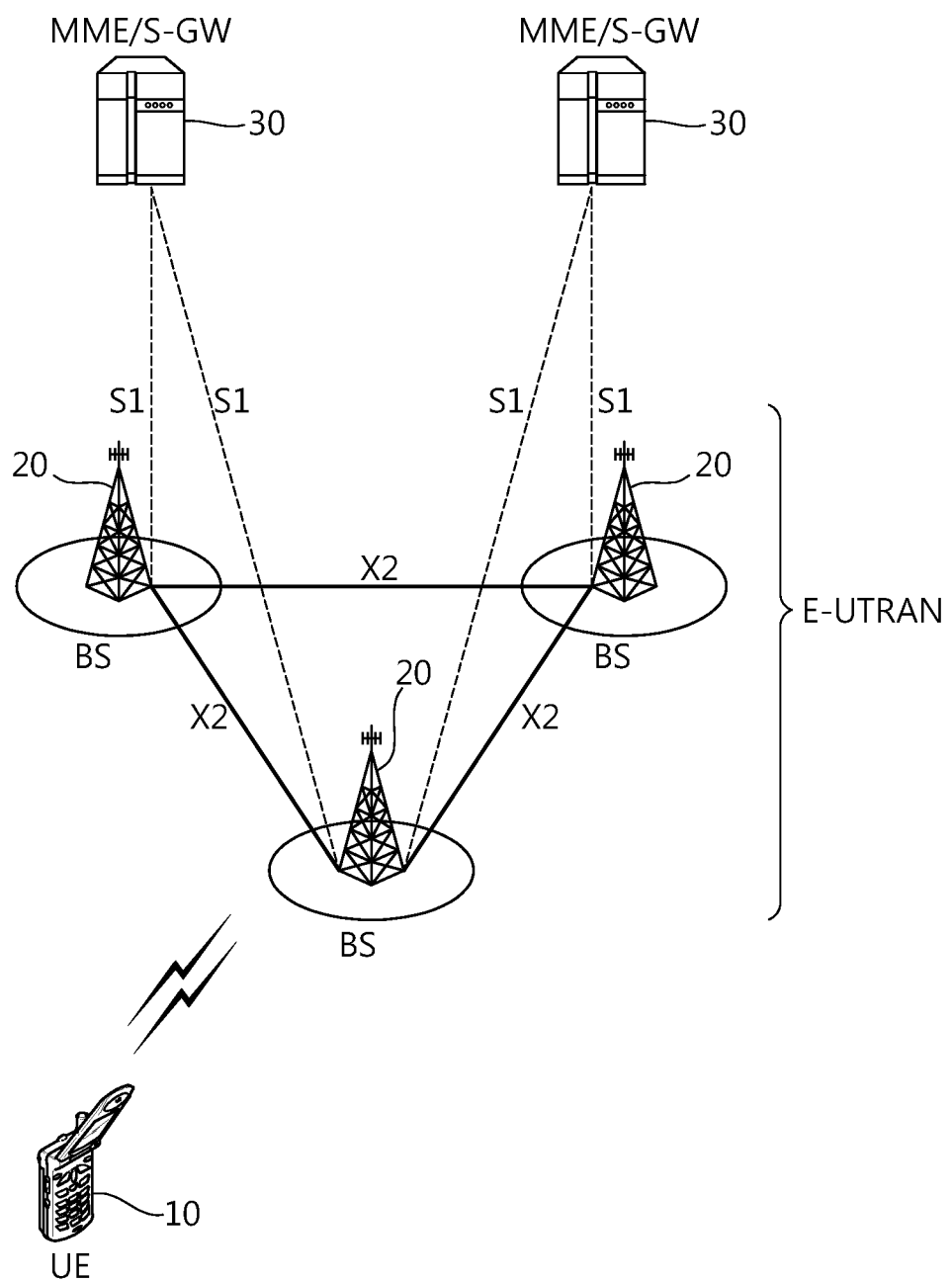
FIG. 1 illustrates a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
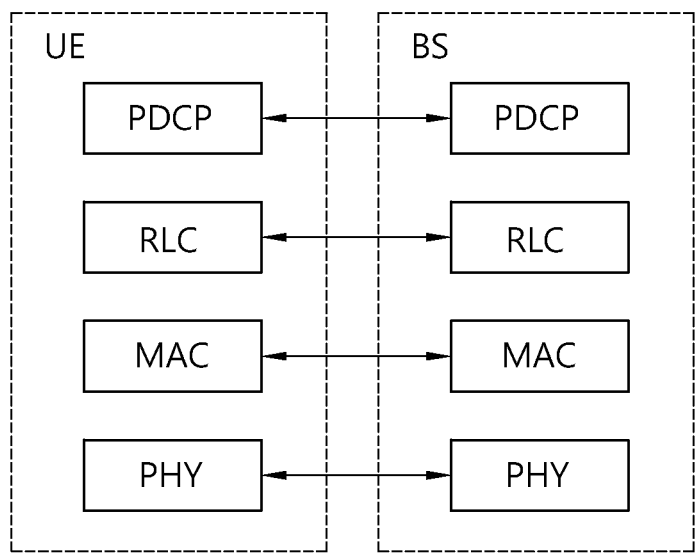
FIG. 2 is a block diagram showing the structure of a wireless protocol on the user plane.
Figure 3:
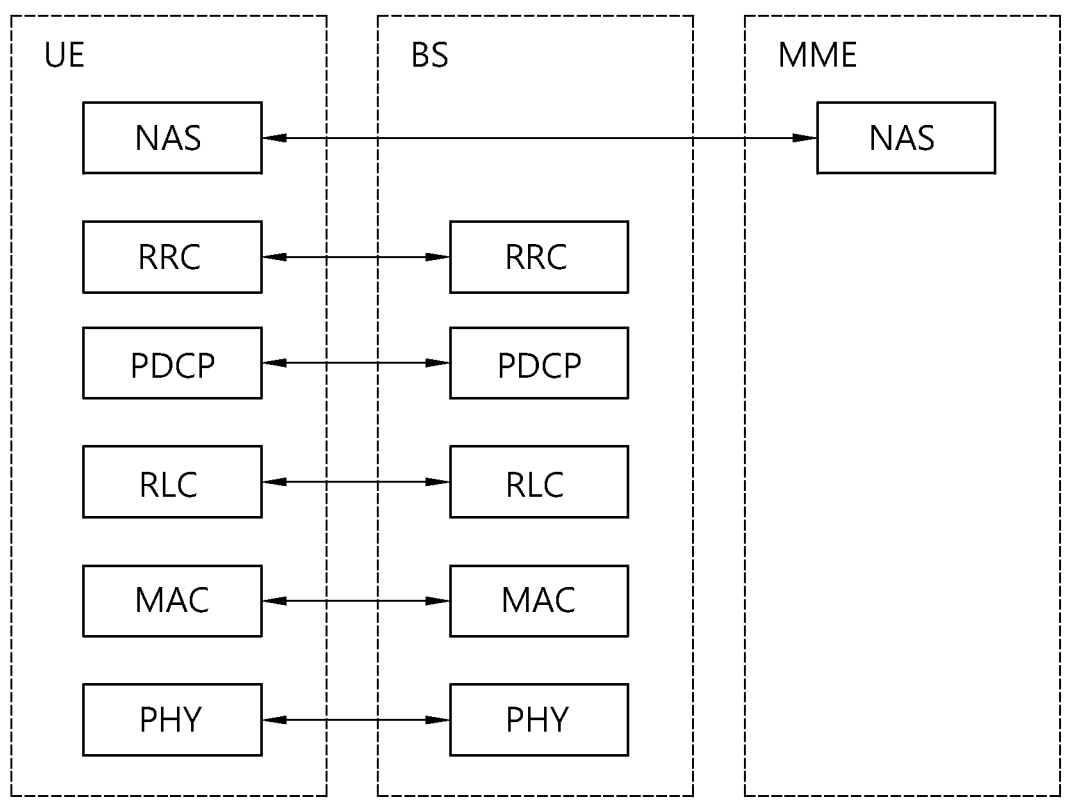
FIG. 3 is a block diagram showing the structure of a wireless protocol on the control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

As disclosed in 3GPP TS 36.211 V8.7.0, a physical channel in a 3GPP LTE may be divided into a PDSCH (Physical Downlink Shared Channel) and a PUSCH (Physical Uplink Shared Channel) being a data channel and a PDCCH (Physical Downlink Control Channel), a PCFICH (Physical Control Format Indicator Channel), a PHICH (Physical Hybrid-ARQ Indicator Channel), and a PUCCH (Physical Uplink Control Channel) being a control channel.

A PCFICH transmitted through a first OFDM symbol of a sub-frame carries a CFI (control format indicator) with respect to the number of OFDM symbols used to transmit control channels in a sub-frame. The terminal firstly receives a CFI on a PCFICH to monitor the PDCCH.

The PDCCH refers to a scheduling channel to carry schedule information as a downlink control channel. The control information transmitted through the PDCCH refers to downlink control information (DCI). The DCI may include resource allocation of the PDSCH (refers to DL grant (downlink grant)), resource allocation of the PUSCH (refers to uplink (UL) grant)), and a group and/or VoIP (Voice over Internet Protocol) of a transmission power control command with respect to individual UEs in an optional UE group.

In the 3GPP LTE, blind decoding is used to detect the PDCCH. The blind decoding de-masks a desired identifier to a CRC (Cyclic Redundancy Check) of a received PDCCH (refers to candidate PDCCH), and checks a CRC error to determine whether a corresponding PDCCH is a control channel thereof.

The base station determines a PDCCH format according to a DCI to be sent to the terminal to attach a CRC to the DCI, and masks a unique identifier (refers to RNTI (Radio Network Temporary Identifier)) according to an owner or a use of the PDCCH.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a process of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME.

When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a MIB (Master Information Block) and a plurality of SIBs (System Information Blocks).

The MIB may include a limited number of parameters which are most frequently transmitted and are required for acquisition for other information from a cell. The terminal firstly searches the MIB after downlink synchronization. The MIB may include information such as a downlink channel bandwidth, PHICH configuration, an SFN to support synchronization and to be operated as a timing reference, and eNB transmission antenna configuration. The MIB may be broadcasted on the BCH.

A SIB1 (SystemInformationBlockType1) among SIBs is transmitted while being included in a SystemInformationBlockType1", and other SIBs except for the SIB1 is transmitted while being included in the system information message. The SIBs may be flexibly mapped to the system information message according to a scheduling information list parameter included in the SIB1. However, each SIB is included in a single system information message, and only SIBs having the same scheduling required value (e.g. period) may be mapped to the same system information message. Further, a SIB2 (SystemInformationBlockType2) is mapped to a system information message corresponding to a first entry in a system information message list of a scheduling information list. A plurality of system information messages may be transmitted within the same time period. The SIB1 and all system information messages are transmitted on a DL-SCH.

Further to broadcast transmission, the E-UTRAN may be dedicated-signaled in a state that the SIB1 includes the same parameter as a preconfiguration value. In this case, the SIB1 may be transmitted while being included in a RRC connection reconfiguration message.

The SIB1 includes information on terminal cell access, and defines scheduling of other SIBs. The SIB1 may include PLMN identifiers of a network, a TAC (Tracking Area Code), a cell ID, a cell barring status to indicate whether a cell may camp-on, the lowest reception level required in a cell used as a cell reselection reference, and information on a transmission time and a time period of other SIBs.

The SIB2 may include radio resource configuration information common in all terminals. The SIB2 may include a uplink carrier frequency, an uplink channel bandwidth, RACH configuration, paging configuration, uplink power control configuration, sounding reference signal configuration, ACK/NACK 신송을 시원하는 PUCCH configuration and PUSCH configuration supporting ACK/NACK transmission.

The terminal may apply acquisition and change sensing procedures of system information with respect to only a PCell. In the SCell, the E-UTRAN may provide all system information on the RRC connection state operation through dedicated signaling when a corresponding SCell is added. When system information on the configured SCell is changed, the E-UTRAN may release a considered SCell and may add the considered SCell later, which may be performed together with a single RRC connection reconfiguration message. The E-UTRAN may configure parameter values different from a value broadcasted in the considered SCell through the dedicated signaling.

The terminal should ensure validity with respect to system information of a specific type. The above system information refers to required system information. The required system information may be defined as follows.

When the terminal is in a RRC idle state: the terminal should to have a valid version of an MIB and the SIB1 as well as a SIB2 to a SIB8, which may depend on support of a considered RAT.

When the terminal is in a RRC connection state: the terminal should ensure to have valid versions of the MIB, the SIB1 and the SIB2.

In general, after the system information is acquired, validity may be ensured with a maximum three hours.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
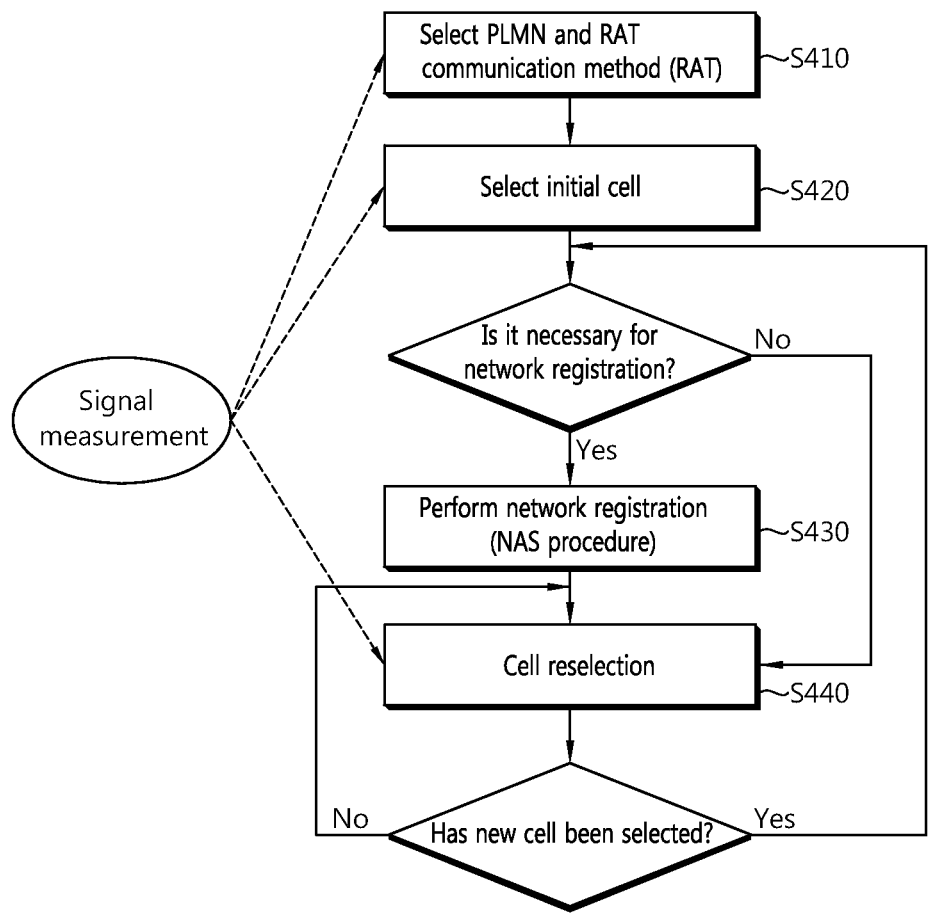
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection process, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This process is called cell reselection differently from the initial cell selection of the No. 2 process. In this case, temporal restriction conditions are placed in order for a cell to be frequently reselected in response to a change of signal characteristic. A cell reselection procedure is described later in detail.

Figure 5:
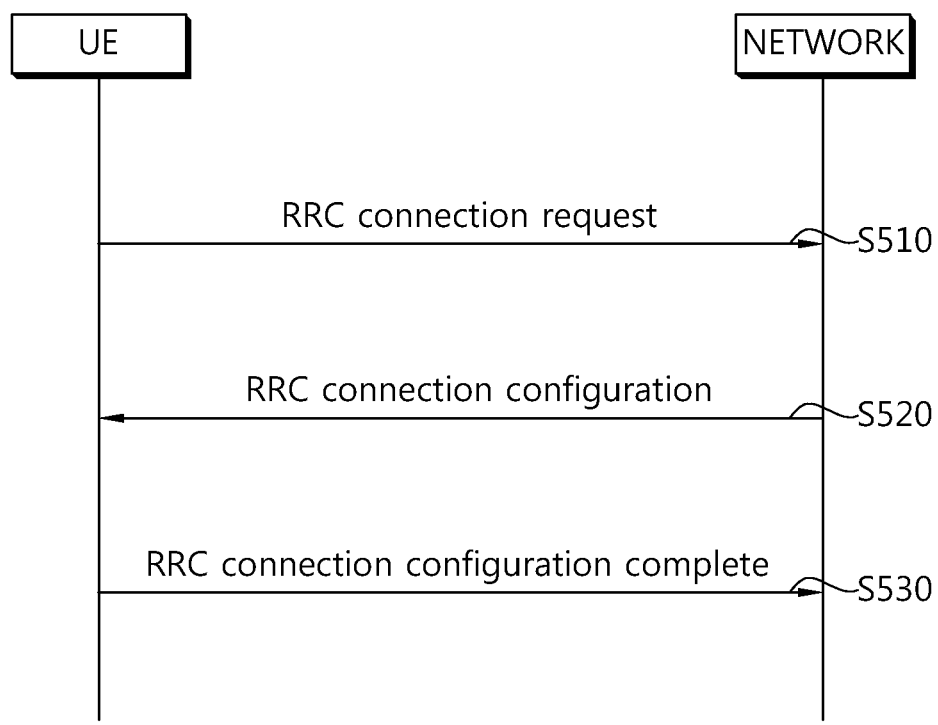
FIG. 5 is a flowchart illustrating a process of establishing RRC connection.

FIG. 5 is a flowchart illustrating a process of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
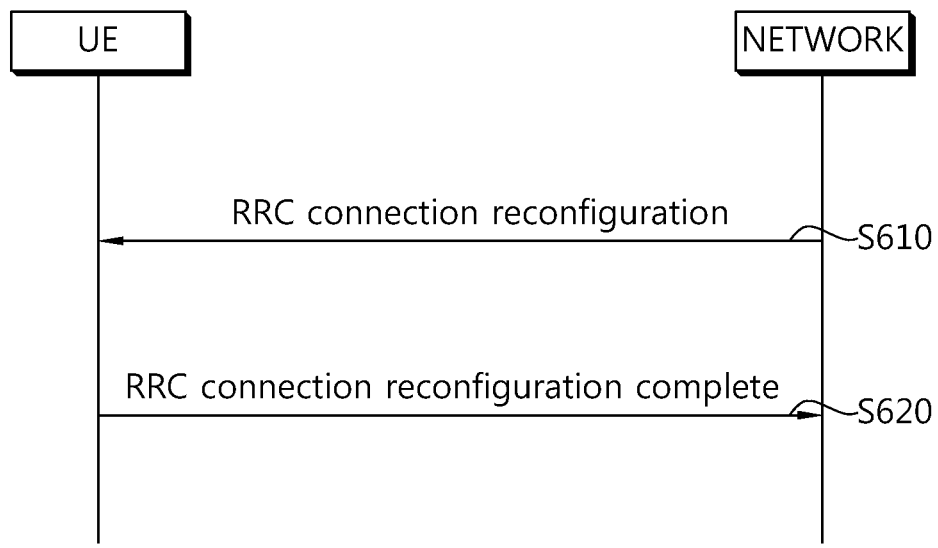
FIG. 6 is a flowchart illustrating an RRC connection reconfiguration process.

FIG. 6 is a flowchart illustrating an RRC connection reconfiguration process. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection process is basically divided into two types.

The first is an initial cell selection process. In this process, UE does not have preliminary information about a wireless channel. Accordingly, the UE searches for all wireless channels in order to find out a proper cell. The UE searches for the strongest cell in each channel. Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection process. If the UE has only to search for a cell that satisfies the cell selection criterion, the UE selects the corresponding cell. If a suitable cell that satisfies the cell selection criterion is not retrieved though such a process, the UE performs an initial cell selection process.

A cell selection reference may be defined as expressed by a following equation 1.

$$Srxlev>0 \text{ AND } Squal>0 \quad \text{[Equation 1]}$$

where:

$$Srxlev = Q_{rxlevmeas} - (Q_{rxlevmin} + Q_{rxlevminoffset}) - Pcompensation$$

$$Squal = Q_{qualmeas} - (Q_{qualmin} - Q_{qualminoffset})$$

In this case, respective variables of the equation 1 may be defined by a following table 1.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signaled values Qrxlevminoffset and Qqualminoffset are a result of periodic search with respect to a PLMN of a higher priority while the terminal camps on a normal cell in the VPLMN. During the periodic search with the PLMN having the higher priority, the terminal may perform cell selection estimation using stored parameters from other cell of the PLMN having the higher priority.

After the UE selects a specific cell through the cell selection process, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a process is called cell reselection. In general, a basic object of the cell reselection process is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection process compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection process is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency.

For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection.

For the intra-frequency or inter-frequency cell reselection, a network may provide UE with a cell reselection black list used in cell reselection. The UE does not perform cell reselection on a cell included in the black list.

Ranking performed in a cell reselection evaluation process is described below.

A ranking criterion used to apply priority to a cell is defined as in Equation 1.

$$R_s = Q_{meas,s} + Q_{hyst} \quad R_n = Q_{meas,s} - Q_{offset}$$ [Equation 1]

In this case, $R_s$ is the ranking criterion of a serving cell, $R_n$ is the ranking criterion of a neighbor cell, $Q_{meas,s}$ is the quality value of the serving cell measured by UE, $Q_{meas,n}$ is the quality value of the neighbor cell measured by UE, $Q_{hyst}$ is the hysteresis value for ranking, and $Q_{offset}$ is an offset between the two cells.

In Intra-frequency, if UE receives an offset "$Q_{offsets,n}$" between a serving cell and a neighbor cell, $Q_{offset} = Q_{offsets,n}$. If UE does not receive $Q_{offsets,n}$, $Q_{offset} = 0$.

In Inter-frequency, if UE receives an offset "$Q_{offsets,n}$" for a corresponding cell, $Q_{offset} = Q_{offsets,n} + Q_{frequency}$. If UE does not receive "$Q_{offsets,n}$", $Q_{offset} = Q_{frequency}$.

If the ranking criterion $R_s$ of a serving cell and the ranking criterion $R_n$ of a neighbor cell are changed in a similar state, ranking priority is frequency changed as a result of the change, and UE may alternately reselect the twos. $Q_{hyst}$ is a parameter that gives hysteresis to cell reselection so that UE is prevented from to alternately reselecting two cells.

UE measures $R_s$ of a serving cell and $R_n$ of a neighbor cell according to the above equation, considers a cell having the greatest ranking criterion value to be the highest-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell reselection.

In order to perform the cell reselection according to the cell reselection estimation, when the cell reselection reference is satisfied for a specific time, the terminal determines that the cell reselection reference is satisfied and may perform cell movement to a selected target cell. In this case, the specific time may be given from the network as a Treselection parameter. The Treselection may specify a cell reselection timer value, and may be defined with respect to each frequency of the E-UTRAN and other RAT.

Hereinafter, cell reselection information used for cell reselection of the terminal will be described.

The cell reselection information is a type of a cell reselection parameter and may be transmitted and provided to the terminal while being included in the system information broadcasted from the network. The cell reselection parameter provided to the terminal may include following types.

Cell reselection priority cellReselectionPriority: The cellReselectionPriority parameter specifies a priority with respect to a frequency of the E-UTRAN, a frequency of a UTRAN, a group of GERAN frequencies, a band glass of a CDMA2000 HRPD or a band glass of a CDMA2000 1×RTT.

$Qoffset_{s,n}$: specifies an offset value between two cells.

$Qoffset_{frequency}$: specifies frequency specific offset with respect to an E-UTRAN frequency having the same priority.

$Q_{hyst}$: specifies a hysteresis value with respect a rank index.

$Q_{qualmin}$: specifies a required minimum quality level in a dB unit.

$Q_{rxlevmin}$: specifies a required minimum Rx in a dB unit.

$Treselection_{EUTRA}$: may specify a cell reselection timer value for the E-UTRAN, and may be configured with respect to each frequency of the E-UTRAN.

$Treselection_{UTRAN}$: specifies a cell reselection timer value for the UTRAN.

$Treselection_{GERA}$: specifies a cell reselection timer value for the GERAN.

$Treselection_{CDMA\_HRPD}$: specifies a cell reselection timer value for CDMA HRPD.

$Treselection_{CDMA\_1 \times RTT}$: specifies a cell reselection timer value for CDMA 1×RTT.

$Thresh_{x, HighP}$: specifies a Srxlev threshold value used by a terminal upon cell reselection to an RAT/frequency having a priority higher than a serving frequency. A specific threshold value may be independently configured with respect to each frequency of the E-UTRAN and the UTRAN, each group of a GERAN frequency, each band glass of CDMA2000 HRPD and each band glass of CDMA2000 1×RTT.

$Thresh_{x, HighQ}$: When cell reselection to RAT/frequency having a priority higher than the serving frequency is performed, a Squal threshold value used by a terminal is specified in a dB unit. The specific threshold value may be independently configured with respect to each frequency of the E-UTRAN and a UTRAN FDD.

$Thresh_{x, LowP}$: When cell reselection to RAT/frequency having a priority lower than the serving frequency is performed, a Srxlev threshold value used by a terminal is specified in a dB unit. The specific threshold value may be independently configured with respect to each frequency of the E-UTRAN and a UTRAN FDD, each group of a GERAN frequency, each band glass of a CDMA2000 HRPD and each band glass of CDMA2000 1×RTT.

$Thresh_{x, LowQ}$: When cell reselection to RAT/frequency having a priority lower than the serving frequency is performed, a Squal threshold value used by a terminal is specified in a dB unit. The specific threshold value may be independently configured with respect to each frequency of the E-UTRAN and a UTRAN FDD.

$Thresh_{Serving, LowP}$: When cell reselection to RAT/frequency having a priority lower than the serving frequency is performed, a Srxlev threshold value used by a terminal is specified in a dB unit.

$Thresh_{serving, LowQ}$: When cell reselection to RAT/frequency having a priority lower than the serving frequency is performed, a Squal threshold value used by a terminal is specified in a dB unit.

$S_{IntraSearchP}$: specifies a Srxlev threshold value with respect to intra-frequency measurement in a dB unit.

$S_{IntraSerachQ}$: specifies a Squal threshold value with respect to intra-frequency measurement in a dB unit.

$S_{nonIntraSerachP}$: specifies E-UTRAN inter-frequency and a Srxlev threshold value with respect to inter-RAT measurement.

$S_{nonIntraSerachQ}$: specifies E-UTRAN inter-frequency and a Squal threshold value with respect to E-UTRAN inter-frequency and inter-RAT measurement.

Meanwhile, the cell reselection information may be provided while being included in a RRC connection release message which is a RRC message transmitted for RRC connection release between the network and the terminal. For example, the RRC connection release message may include a sub-carrier frequency list and cell reselection priority of the E-UTRAN, a sub-carrier frequency list and cell reselection priority of the UTRA-FDD, a sub-carrier frequency list and cell reselection priority of the UTRA-TDD, a sub-carrier frequency list and cell reselection priority of the GERAN, a band glass list and cell reselection priority of the CDMA2000 HRPD, and a band glass list and cell reselection priority of CDMA2000 1×RTT.

A Radio Link Failure (RLF) is described below.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
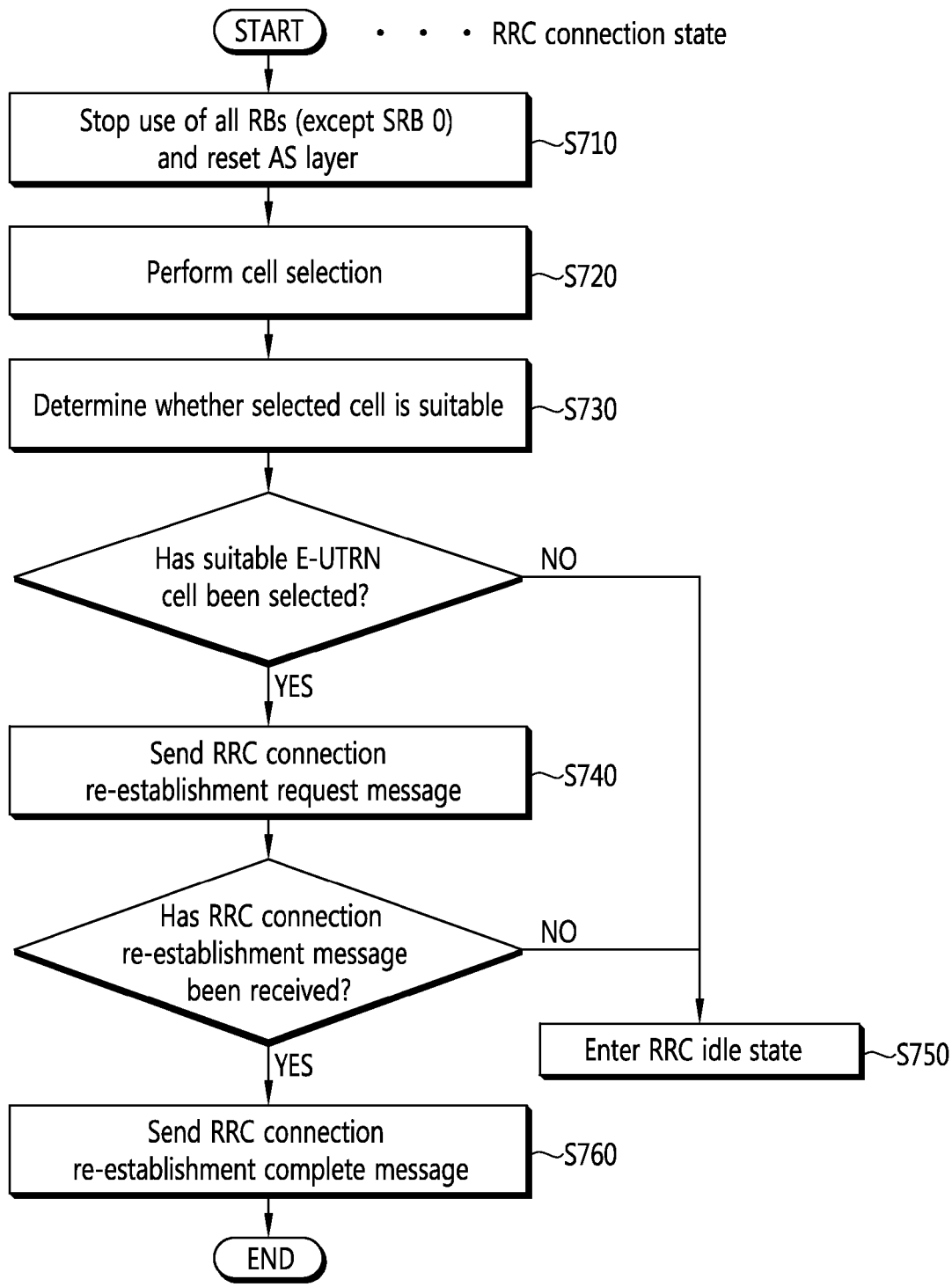
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this process, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer. The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Hereinafter, operations of the terminal and the network associated with RRC connection rejection will be described.

As in congestion of a communication environment, if normal service is not provided to the terminal in a specific frequency and/or specific RAT, the network may limit movement performing of the terminal. For example, the network set to lower priority for cell reselection with respect to at least one frequency (e.g. current serving frequency) and/or all frequencies of and/or specific RAT (e.g. E-UTRAN) to a lowest priority, and provides information thereon to limit movement of the terminal through cell reselection.

The information on de-prioritization configuration may be provided by the network during a RRC connection establishment procedure between the terminal and the network. The terminal in the RRC idle state selects a target cell and attempts RRC connection establishment with a corresponding cell. Since the target cell does not provide a normal service to the terminal due to congestion and the like, the target cell may reject RRC connection request received from the terminal. Accordingly, the target cell may transmit a RRC connection rejection message to the terminal. In this case, the target cell may transmit the RRC connection rejection message while adding de-prioritization request information to indicate applying the lowest priority with respect to at least one frequency (e.g. current frequency) and/or specific RAT (e.g. E-UTRAN) to the RRC connection rejection message.

De-prioritization request information may include de-prioritization type information indicating a type to which de-prioritization is applied and de-prioritization timer information being de-prioritization applying maintenance. The de-prioritization type information may indicate a target to which lowest priority is applied. For example, the de-prioritization type information may indicate to apply the lowest priority with respect to a frequency of a cell transmitting a RRC connection rejection message. Further, the de-prioritization type information may indicate to apply the lowest priority with respect to all frequencies of an RAT (e.g. E-UTRAN) of a corresponding cell.

When the terminal receives a RRC connection rejection message including the de-prioritization request information, the terminal apply and operate de-prioritization according to the de-prioritization request information. The terminal may consider to store a frequency and/or RAT indicated according to the de-prioritization request information, and to apply the lowest priority with respect to a corresponding frequency and/or RAT. For example, the terminal may consider to configure a list with respect to all frequencies at least one frequency and/or RAT indicated by the de-prioritization request information, and to apply the lowest priority in a corresponding list. Further, the terminal may configure and drive a time by a maintenance time indicated according to de-prioritization timer information of the de-prioritization request information, and may apply and operate de-prioritization with respect to an associated frequency during a timer operation.

If there is previous de-prioritization request information acquired through a previous RRC connection rejection message and an associated previous de-prioritization timer is not terminated, the terminal may also store the frequency and/or RAT indicated by the previous de-prioritization request information, and the lowest priority may be applied to the above.

As described above, de-prioritization is configured and operated. The de-prioritization request information is provided so that the network environment may be changed while the terminal operates based on the above. For example, the network configures and operates in order to limit movement to a specific frequency and/or specific RAT due to a reason such as congestion. The congestion is solved so that there may not be limitation with respect to movement performing of the terminal longer. In this case, the network may release and operate configuration of de-prioritization.

When the network releases de-prioritization configuration, the terminal may apply and operate the lowest priority with respect to at least one associated frequency and/or all frequencies of the associated RAT while a de-prioritization timer is driven. Accordingly, the terminal may normally establish RRC connection but may not move to a cell of a frequency capable of providing a service or a cell of a RAT. The above operation of the terminal may cause a problem in that partial radio resource is inefficiently used and provides inefficient service with respect to the terminal.

The present invention suggests a method in that a network provides information indicating to cancel applying de-prioritization of the terminal and accordingly the terminal handles and operates priority in the cell reselection priority handling-based operation of the terminal. Hereinafter, applying de-prioritization to a specific RAT illustrates applying priority to all frequencies of an E-UTRAN. However, a scope of the present invention is not limited thereto, and a case of applying de-prioritization to all frequencies of other specific RAT such as the UTRAN and the GERAN is applicable to the embodiment of the present invention.

Figure 8:
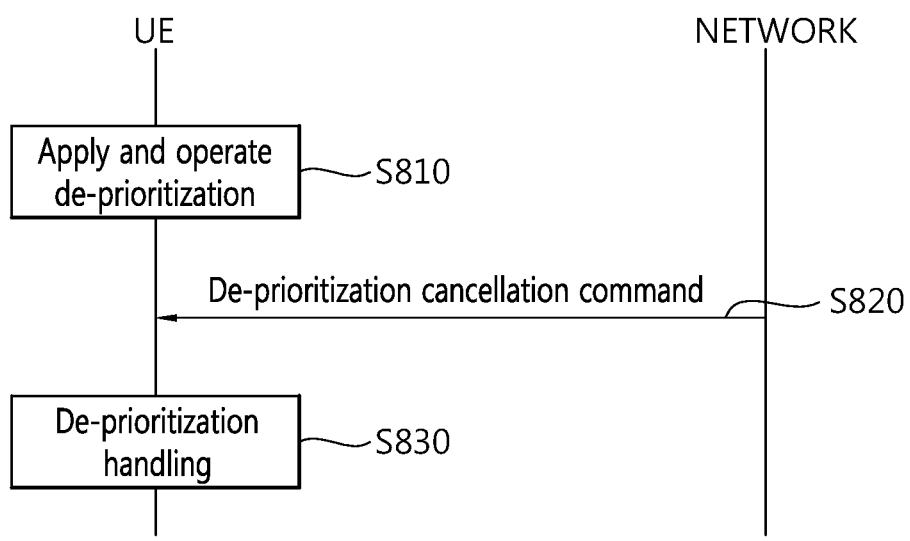
FIG. 8 is a diagram illustrating a priority handling-based operation method according to an embodiment of the present invention.

FIG. 8 is a diagram illustrating a priority handling-based operation method according to an embodiment of the present invention.

Referring to FIG. 8, the terminal applies and operates de-prioritization (S810). The terminal may consider to acquire de-prioritization request information from the network and to apply the lowest priority to at least one frequency and/or all frequencies of E-UTRAN. Further, the terminal may drive and operate a de-prioritization timer from acquisition of de-prioritization request information.

When the terminal operates according to acquisition of de-prioritization request information from the network, due to solution of congestion of the network, the network may determine that there is no need to apply de-prioritization with respect to a specific frequency and/or all frequencies of the E-UTRAN. Accordingly, the network transmits a de-prioritization cancellation command to the terminal (S820).

1) The de-prioritization cancellation command may indicate whether to cancel applying de-prioritization to one or more frequencies or all frequencies of the E-UTRAN.

The de-prioritization cancellation command may indicate at least one frequency in which applying the de-prioritization is cancelled. For example, the de-prioritization cancellation command may indicate a current serving frequency in which applying the de-prioritization is canceled.

The de-prioritization cancellation command may indicate an E-UTRAN in which the de-prioritization is canceled. When the terminal attempts to access the UTRAN or the GERAN by applying de-prioritization to all frequencies of the E-UTRAN, a de-prioritization cancellation command may be transmitted to the terminal from a cell of the UTRAN or the GERAN. As another example, when the terminal applies de-prioritization to at least one frequency, and accesses the E-UTRAN through a frequency different from the above frequency, the de-prioritization cancellation command with respect to the frequency of the whole E-UTRAN to the terminal from a cell of the accessed E-UTRAN may be transmitted.

The de-prioritization cancellation command may be transmitted to the terminal through a RRC message. The RRC message may include a RRC connection configuration message to be transmitted to the terminal during a RRC connection establish procedure. The RRC message may include a RRC connection reconfiguration message. The RRC message may include another downlink RRC message.

2) The de-prioritization cancellation command may include dedicated priority information in which the terminal may use. That is, the network may transmit dedicated priority information to the terminal in order to cancel applying de-prioritization to at least one frequency.

The dedicated priority information as the de-prioritization cancellation command may be transmitted to the terminal through a RRC message. The RRC message may include a RRC connection release message or other downlink RRC message.

3) The de-prioritization cancellation command may include a specific frequency or movement command information to a cell of the E-UTRAN. That is, the network may transmit movement command information in order to move from a cell of a currently accessed specific frequency or a cell of a UTRAN or a GERAN to a cell of other frequency or a cell of the E-UTRAN by applying the de-prioritization. In this case, the terminal may consider the movement command information as the de-prioritization cancellation command.

For example, when the terminal accesses the UTRAN or the GERAN, and movement command information to a cell in the E-UTRAN is received while applying the de-prioritization to all frequencies of the E-UTRAN, it may be considered that the terminal receives de-prioritization cancellation command.

As another example, when the terminal accesses the UTRAN or the GERAN, and movement command information to a cell in a specific frequency of the E-UTRAN is received while applying the de-prioritization to all frequencies of the E-UTRAN, it may be considered that the terminal receives de-prioritization cancellation command.

Referring back to FIG. 8, when the terminal receives the de-prioritization cancellation command, the terminal performs de-prioritization handling (S830).

The may cancel all applied de-prioritization or de-prioritization with respect to a specific frequency. The applying the de-prioritization may be canceled by implementing de-prioritization cancellation command.

If the terminal receives de-prioritization cancellation command to indicate cancellation of applying the de-prioritization to the specific frequency, the terminal may determine to stop applying the de-prioritization to a frequency indicated by the de-prioritization cancellation. Accordingly, the terminal may cancel a frequency indicated by the de-prioritization command among frequencies of the de-prioritization frequency list.

If the terminal receives the de-prioritization cancellation command to indicate cancellation of applying the de-prioritization to all frequencies of the E-UTRAN, the terminal may determine to cancel applying the de-prioritization to all frequencies of the E-UTRAN. Accordingly, the terminal may remove all the frequencies of the E-UTRAN among frequencies of the de-prioritization frequency list. When the de-prioritization is applied to only the frequency of the E-UTRAN, a terminal receiving de-prioritization cancellation command to indicate cancellation of applying the de-prioritization to all frequencies of the E-UTRAN may remove all frequencies in the de-prioritization list.

The terminal receiving de-prioritization applying cancellation command implemented as the dedicated priority information may determine to cancel applying all de-prioritization. Accordingly, the terminal may remove all frequencies of the de-prioritization frequency list.

The terminal receiving de-prioritization applying cancellation command implemented as movement command information may determine cancellation of applying the de-prioritization with respect to all frequencies of the E-UTRAN. Accordingly, the terminal may remove a frequency indicated by a de-prioritization command among frequencies of the de-prioritization frequency list.

If the terminal receives the de-prioritization command implemented as movement command information of a cell on the specific frequency of the E-UTRAN, the terminal may determine to cancel applying the de-prioritization to a corresponding frequency. Accordingly, the terminal may remove all frequencies of the E-UTRAN among frequencies of the de-prioritization frequency list. When the de-prioritization is applied to a frequency of the E-UTRAN, the terminal receiving de-prioritization cancellation command to indicate cancellation of applying de-prioritization to all frequencies of the E-UTRAN may remove all frequencies of the de-prioritization.

The terminal may handle the de-prioritization timer associated with reception of the de-prioritization command and de-prioritization handling according thereto.

When the de-prioritization cancellation command indicating cancellation of applying the de-prioritization to the all frequencies of the E-UTRAN, the terminal cancels applying the de-prioritization to all frequencies so that a drive of the de-prioritization timer is not required. Accordingly, in this case, the terminal may stop the de-prioritization timer.

If there is no frequency to which the de-prioritization is applied by receiving the de-prioritization command indicating cancellation of applying the de-prioritization to the specific frequency and cancelling applying the de-prioritization to the corresponding frequency, the drive of the de-prioritization timer may not be required. Accordingly, the terminal may stop the de-prioritization timer.

Since the terminal receiving the de-prioritization implemented as the dedicated priority information cancels applying all the de-prioritization, the drive of the de-prioritization timer may not be required. Accordingly, the terminal may stop the de-prioritization timer.

If the terminal receives the de-prioritization cancellation command implemented as the movement command information, the terminal cancels applying the de-prioritization to all frequencies or the specific frequency. Accordingly, if the applying all the de-prioritization is cancelled, the drive of the de-prioritization timer may not be required. Accordingly, the terminal may stop the de-prioritization timer.

Unlike the above case, in spite of the de-prioritization cancellation, when a frequency to which the de-prioritization is applied has remained (there is at least one frequency in a frequency list to which the de-prioritization is applied), the terminal may operation to continue the de-prioritization timer. The applying the de-prioritization to a remaining frequency may be stopped upon termination of an associated de-prioritization timer.

The terminal handling the de-prioritization may operate based on the handled priority according to the de-prioritization cancellation command. The terminal may apply the lowest priority to a frequency to which the de-prioritization is applied after the de-prioritization handling. In contrast, a priority signaled from a cell is applied to the frequency in which the de-prioritization is canceled through the handling so that movement may be performed. In this case, movement of the terminal may include performing cell reselection.

In addition, the terminal may report information on the de-prioritization in order to support a de-prioritization cancellation command of the network. The terminal may report that the de-prioritization is applied to at least one frequency to which the de-prioritization is applied and/or all frequencies of the E-UTRAN. The de-prioritization report information may be transmitted to the network through the RRC message. The RRC message including the de-prioritization report information may be transmitted while being included in a RRC connection configuration complete message, a RRC connection request message, a RRC connection reconfiguration complete message or other downlink RRC message.

If the terminal reports de-prioritization information to the network, the network may recognize a de-prioritization situation applied by the terminal. Accordingly, the network may configure the de-prioritization command by taking into consideration the current network environment and/or the de-prioritization applying situation of the terminal. Accordingly, cancellation of applying the de-prioritization to a frequency to which the de-prioritization is applied and/or all frequencies of a specific RAT may be indicated by the terminal. Cancellation with respect to non-applied frequency and/or all frequencies of a specific RAT may be avoided.

Figure 9:
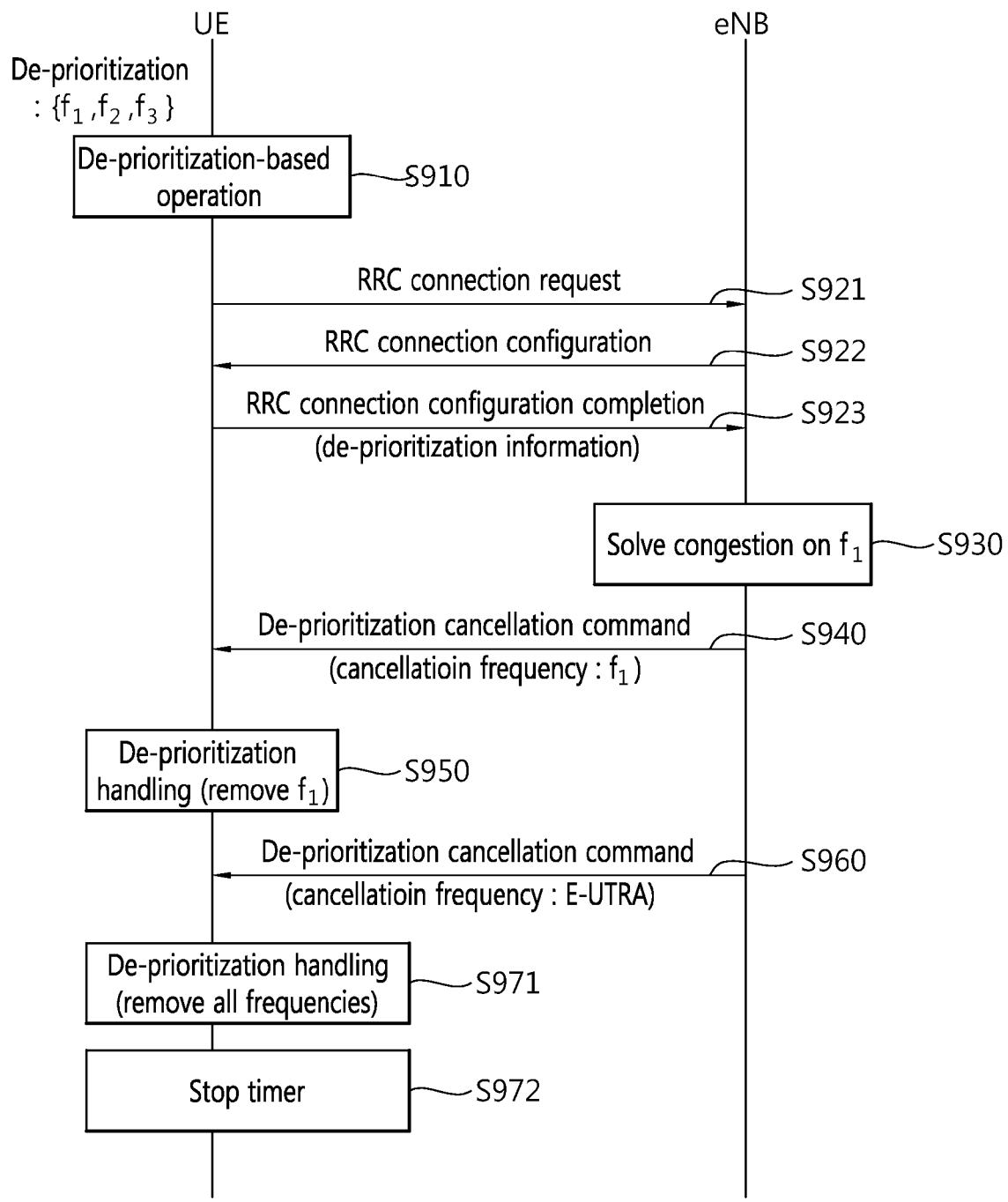
FIG. 9 is a diagram illustrating an example of a priority handling-based operation method according to an embodiment of the present invention.

FIG. 9 is a diagram illustrating an example of a priority handling-based operation method according to an embodiment of the present invention. In the example of FIG. 9, congestion is generated on frequencies f1, f2, and f3 of the E-UTRAN so that the network assumes environment which applies the de-prioritization to a corresponding frequency to be operated.

Referring to FIG. 9, the terminal applies de-prioritization to the frequencies $f_1$, $f_2$, and $f_3$ (S910). When the terminal receives a RRC connection rejection message including de-prioritization request information during RRC connection establishment with a previous network, the terminal may apply de-prioritization with respect to the above frequencies. The terminal may store frequencies $f_1$, $f_2$, and $f_3$ in the de-prioritization frequency list. Further, the terminal may drive a de-prioritization timer associated with de-prioritization application with respect to the above frequency.

The terminal may apply the lowest priority to frequencies $f_1$, $f_2$, and $f_3$ to perform cell reselection. Accordingly, the terminal may determine to select a specific target cell, and to start RRC connection establishment for access to a target base station (eNB in the example).

For the RRC connection establishment, the terminal transmits a RRC connection request message to an eNB (S921). If the eNB determines to allow the RRC connection establishment of the terminal, the eNB transmits a RRC connection configuration message to the terminal (S922). The terminal transmits the RRC connection configuration complete message to the eNB for completion of the RRC connection establishment procedure (S923).

The terminal may transmit the RRC connection configuration complete message to the eNB while adding the de-prioritization information to the RRC connection configuration complete message. The de-prioritization information may indicate that the terminal applies the de-prioritization to current frequencies $f_1$, $f_2$, and $f_3$. To this end, the de-prioritization information may include a de-prioritization frequency list including the frequencies $f_1$, $f_2$, and $f_3$. Accordingly, the terminal may provide information on the currently applied de-prioritization to the network.

Frequency $f_1$ phase congestion may be solved during the de-prioritization-based operation between the terminal and the network (S930). In this case, the network may determine to release applying the de-prioritization to the frequency $f_1$.

The eNB transmits the de-prioritization cancellation command to the terminal by releasing the applying the de-prioritization to the frequency $f_1$ (S940). The de-prioritization cancellation command may include a frequency list including the frequency $f_1$ in order to indicate cancellation of the de-prioritization with respect to the frequency $f_1$.

If the terminal receives the de-prioritization cancellation command, the terminal performs de-prioritization handling. The terminal may remove the frequency $f_1$ indicated to be cancelled by the de-prioritization cancellation command from the de-prioritization frequency list. Accordingly, the applying the de-prioritization to the frequency $f_1$ of the terminal. Meanwhile, since the terminal still applies the de-prioritization to the frequencies $f_2$ and $f_3$, the terminal may operate the de-prioritization timer without stopping the de-prioritization timer.

If the terminal deviates from the RRC connection state after step S950, the terminal applies a signaled priority from the network to the frequency $f_1$. The lowest priority may be applied to the frequencies $f_2$ and $f_3$. That is why the de-prioritization is still applied to the frequencies $f_2$ and $f_3$.

As described above, when the terminal is operated by applying the handled de-prioritization, the network may determine to release the applying the de-prioritization to all frequencies of the E-UTRAN. For example, when congestion is solved from all frequencies of the E-UTRAN, the network may determine to release applying the de-prioritization to all the frequencies of the E-UTRAN. Accordingly, the eNB transmits the de-prioritization to the terminal (S960). The de-prioritization cancellation command may indicate to release applying the de-prioritization to all frequencies of the E-UTRAN.

If the terminal receives the de-prioritization cancellation command, the terminal performs de-prioritization handling (S971). The terminal may remove all frequencies of the E-UTRAN indicated to be cancelled according to the de-prioritization cancellation command from the de-prioritization frequency list. Accordingly, the de-prioritization may be cancelled with respect to the frequencies $f_2$ and $f_3$ of the terminal. Further, since the applying the de-prioritization to the frequencies $f_1$, $f_2$, and $f_3$ associated with the existing operated de-prioritization timer is all cancelled, the terminal may stop the de-prioritization timer (S972).

If the terminal deviates from the RRC connection state after step S972, the terminal applies a signaled priority form the network to frequencies $f_1$, $f_2$, and $f_3$.

In accordance with the priority handling-based operation method according to the embodiment of the present invention, the terminal may receive de-prioritization command from the network and accordingly perform de-prioritization handling. The terminal may cancel applying the de-prioritization to a specific frequency before terminating the de-prioritization timer, and may be operated on the basis of the handling priority. In addition, the terminal may receive information on the applied de-prioritization to the network and may receive the de-prioritization suitable for the network environment to handle the de-prioritization. Accordingly, the terminal adaptively handles the priority to perform movement so that improved service may be provided to the terminal. Further, erroneous movement of the terminal or signaling for limiting mobility of the terminal may be prevented so that the efficiency of a radio resource can be improved.

Figure 10:
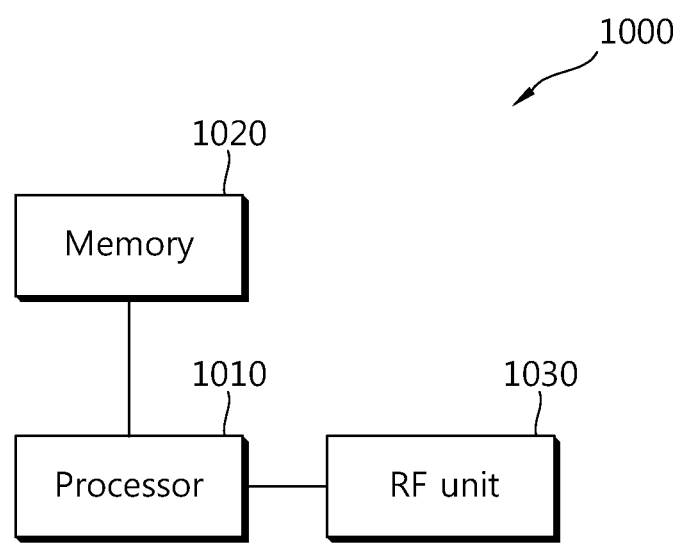
FIG. 10 is a block diagram illustrating a wireless apparatus according to an embodiment of the present invention.

FIG. 10 is a block diagram illustrating a wireless apparatus according to an embodiment of the present invention. The wireless apparatus may implement the priority handling-based operation method according to the above embodiment with reference to FIGS. 8 and 9.

Referring to FIG. 10, the wireless apparatus 1000 includes a processor 1010, a memory 1020, and a radio frequency (RF) unit 1030. The processor 1010 performs the proposed functions, processes and/or methods. The processor 1010 may be configured to set mobility limitation information.

The processor 1010 may be configured to apply the de-prioritization to at least one frequency. The processor 1010 may be configured to transmit/receive the de-prioritization cancellation command. The processor 1010 may be configured to handle the de-prioritization based on the de-prioritization cancellation command. The processor 1010 may be configured to implement the embodiment of the present invention with reference to FIGS. 8 and 9.

The RF unit 1030 is connected to the processor 1810, and sends and receives radio signals.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for handling de-prioritization during cell reselection procedure in a wireless communication system, the method performed by a user equipment (UE) and comprising:
    receiving, from a network, de-prioritization request information including a list of frequencies to be de-prioritized during a cell reselection procedure;
    starting a de-prioritization timer upon receiving the de-prioritization request information;
    de-prioritizing all frequencies included in the list of frequencies such that a priority for each of the frequencies in the list is lowered to a lowest priority during the cell reselection procedure;
    receiving, from the network while the de-prioritization timer is running, a de-prioritization cancellation command indicating at least one specific frequency for which de-prioritization is cancelled;
    if the at least one specific frequency includes all frequencies in the list of frequencies:
        cancelling the de-prioritizing, and
        stopping the de-prioritization timer; and
    if at least one of the frequencies in the list of frequencies is not included in the at least one specific frequency:
        maintaining the de-prioritization timer, and
        while the de-prioritization timer is running, maintaining the de-prioritization of any frequency in the list that is not included in the at least one specific frequency.

2. The method of claim 1, wherein the de-prioritization cancellation command further indicates specific radio access technology (RAT) in which the applying the de-prioritization is cancelled.

3. The method of claim 2, further comprising:
    removing all frequencies associated with the specific RAT from the de-prioritization frequency list when the de-prioritization cancellation command indicates the specific RAT in which the applying the de-prioritization is cancelled.

4. The method of claim 1, wherein the de-prioritization cancellation command comprises dedicated priority signaling information usable by the UE.

5. The method of claim 1, further comprising:
    reporting, to the network, information on the handled de-prioritization.

6. The method of claim 1, further comprising:
    not applying the de-prioritization when the de-prioritization timer stops or expires.

7. A user equipment (UE) comprising:
    a Radio Frequency (RF) unit that sends and receives radio signals; and
    a processor that is functionally coupled to the RF unit and configured to:
        receive, from a network, de-prioritization request information including a list of frequencies to be de-prioritized during a cell reselection procedure;
        start a de-prioritization timer upon receiving the de-prioritization request information;
        de-prioritize all frequencies included in the list of frequencies such that a priority for each of the frequencies in the list is lowered to a lowest priority during the cell reselection procedure;
        receive, from the network while the de-prioritization timer is running, a de-prioritization cancellation command indicating at least one specific frequency for which de-prioritization is cancelled;
        if the at least one specific frequency includes all frequencies in the list of frequencies to be de-prioritized:
            cancel the de-prioritization, and
            stop the de-prioritization timer; and
        if at least one of the frequencies in the list of frequencies is not included in the at least one specific frequency:
            maintain the de-prioritization timer, and
            while the de-prioritization timer is running, maintain the de-prioritization of any frequency not included in the at least one specific frequency.

8. The UE of claim 7, wherein the de-prioritization cancellation command further indicates specific radio access technology (RAT) in which the applying the de-prioritization is cancelled.

9. The UE of claim 8, wherein when the de-prioritization cancellation command indicates specific RAT in which the applying the de-prioritization is cancelled, the processor removes all frequencies associated with the specific RAT from the de-prioritization frequency list.

10. The UE of claim 7, wherein the de-prioritization cancellation command comprises dedicated priority signaling information usable by the UE.

11. The UE of claim 7, wherein the processor further configured to report, to the network, information on the handled de-prioritization.

12. The UE of claim 7, wherein, when the de-prioritization timer stops or expires, the processor does not apply the de-prioritization.

\* \* \* \* \*